March 30, 1965     J. BAUDE     3,176,145
STATIC RELAY SYSTEM EMPLOYING IMPROVED ANNUNCIATOR DEVICES
Filed Dec. 23, 1960     2 Sheets-Sheet 1

Inventor
John Baude
by Warren F.B. Finley
Attorney

March 30, 1965

J. BAUDE 3,176,145

STATIC RELAY SYSTEM EMPLOYING IMPROVED ANNUNCIATOR DEVICES

Filed Dec. 23, 1960

Inventor
John Baude
By Warren F. B. Lindsley
Attorney

United States Patent Office 3,176,145
Patented Mar. 30, 1965

3,176,145
STATIC RELAY SYSTEM EMPLOYING IMPROVED ANNUNCIATOR DEVICES
John Baude, Milwaukee, Wis., assignor to Allis-Chalmers Manufacturing Company, Milwaukee, Wis.
Filed Dec. 23, 1960, Ser. No. 78,060
3 Claims. (Cl. 307—88)

This invention relates to annunciators or indicating devices and particularly to devices indicating the occurrence of an electrical signal.

In the new system disclosed and claimed static circuits are used throughout making possible the use of miniaturized components of high reliability which are not affected by vibration or mechanical shock or other adverse environmental conditions. All sensing and time relay functions are performed at a low power level by static circuits. The control functions for effecting operation of, for example, a circuit breaker are performed by static bistable circuits or flip-flops at low power levels with the final output signals being amplified to a sufficiently high level to effect operation of the final control devices. A system is provided which operates almost entirely at a low power level, so that there is little heat to be dissipated and small, rugged, static components are utilized so that the system can be made small and compact. This new system is highly reliable since it does not depend on accurate calibration of devices involving moving parts and is compensated for temperature variations normally encountered in locations where protective relays are installed.

Proper indication of primary relay operation is an important phase in the operation of an electric power distribution system. The presently used means of indicating such relay operation consists of "targets" which are electro-mechanical device which function to release a flag indicating that the coil circuit of a relay device was energized. This target is operated by a coil that is connected into the relay operating contact circuit for a short period of time to carry the trip current of the power circuit breaker. Since these devices have to be made rather small to fit into the relay cases and to provide for the necessary fast pickup time their restraining forces have to be kept small. It is therefore possible that excessive vibration such as may occur during circuit breaker operation prematurely releases the target giving false indications. Because reliable target indication is necessary to track down the source of trouble in circuit breaker operation the following new and improved relay and annunciator devices have been provided.

In accordance with the invention claimed a new and improved protective relay system is provided for controlling a power source comprising a static relay storage device for receiving electrical quantities from a power source and to emit a second electrical quantity. A sensing circuit or device is employed for passing to the storage device electrical quantities from a power source in the form of a continuous current flow or only voltage or current pulses of predetermined magnitude and duration. The storage device is charged at a rate depending upon the electrical volt-second quantity passed by the sensing device. A registration device is provided which utilizes a magnetic memory core. The storage device upon exceeding a predetermined energy level discharges at least a part of its energy into the memory core. The memory core, in turn is connected to a load circuit which may employ a visual indicating device such as a lamp. Means for determining the state of energization of the memory core also may be employed, if so desired.

It is, therefore, one object of this invention to provide a new and improved relay system.

Another object of this invention is to provide a new and improved static relay system utilizing the registration and/or regulation of electrical quantities for controlling the operation of a plurality of electrical devices.

A further object of this invention is to provide a new and improved relay system in which a plurality of pulses of different electrical quantities are fed into static devices to provide a resultant force which controls an electrical device.

A still further object of this invention is to provide a new and improved annunciator circuit.

A still further object of this invention is to provide a new and improved static annunciator device for static relay systems.

Objects and advantages other than those set forth will be apparent from the following description when read in connection with the accompanying drawing, in which:

FIGS. 5 and 6 are illustrations showing modifications of the transformer, magnetic memory core arrangement shown in FIG. 3.

Figure 1:
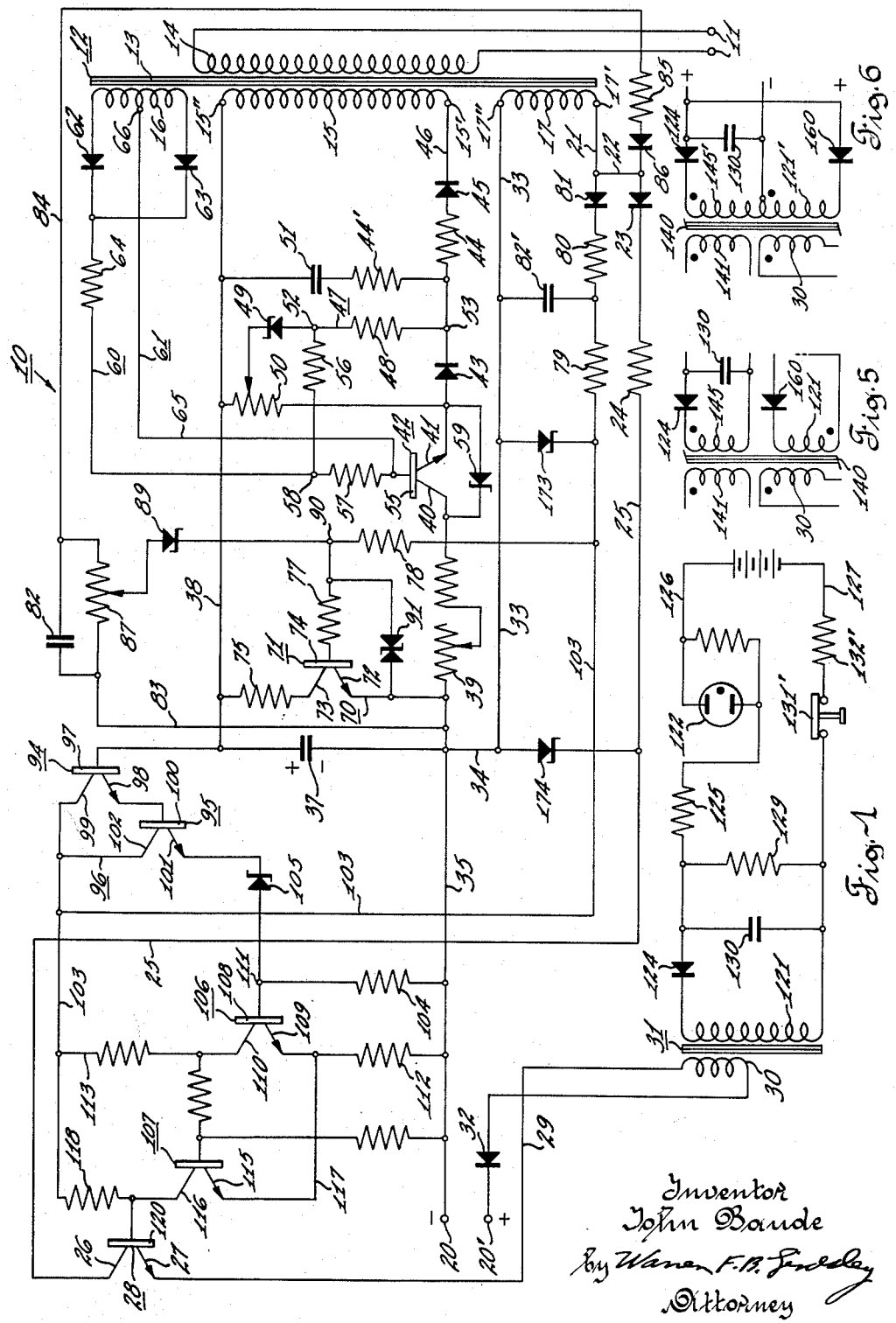
FIG. 1 is a diagrammatic view of an improved protective relay system embodying the invention.

It will be apparent that the basic principles of the invention can be applied in various ways to perform the sensing and control functions required for different installations. However, in order to illustrate the invention, a few typical embodiments have been shown in the drawings applied to the control and protection of a power source through the operation of a circuit breaker (not shown).

Referring more particularly to the drawings wherein like parts are designated by like characters of reference throughout the figures, FIG. 1 illustrates a protective relay system 10 which is utilized for sensing a variable electrical condition in a power source 11. Relay system 10 receives power from source 11 through a transformer 12 which is electrically associated therewith. Transformer 12 comprises a core 13, at least one input or primary winding 14 directly connected across the power source 11 and a plurality of secondary windings for example windings 15, 16 and 17. If the power source 11 transmits, for example, a series of electrical pulses then the secondary windings associated with transformer 12 will transmit to the relay system 10 a plurality of signal pulses, the duration, amplitude and frequency of which depend upon the saturation condition of core 13 and these same conditions among other things of the primary power source.

Secondary windings 15, 16 and 17 of transformer 12 are connected to inverse time-voltage or inverse time-current circuits of the relay and employ transistor controlled pulse responsive electrical circuit elements with integrating inverse time-voltage or current characteristics. In order to make the unit suitable for protective relaying purposes, the characteristics of the relay must be extremely flexible. Its accuracy must be unaffected by temperatures normally encountered and excessive overload currents due to short circuits in the power circuit 11, and resulting voltage surges must be absorbed in such a manner that no damage results to the relay.

As shown in FIG. 1 a system is provided for the control and production of a signal applied to the output terminals 20, 20'. This applied signal to terminals 20, 20' is the output signal of secondary winding 17 of transformer 12 fed from terminal 17' of winding 17 through conductor 21, conductor 22, diode 23, resistor 24, conductor 25, collector 26 and emitter 27 of the normally nonconductive transistor 28, conductor 29, primary winding 30 of transformer 31, diode 32 to terminal 20', and from terminal 17" of winding 17 through conductors 33, 34 and 35 to terminal 20.

Transistor 28 controlling the applied signal pulse to terminals 20, 20' is in turn controlled by the integrated effects of the electrical energy such as, for example, pulses received from secondary windings 15, 16 and 17 of transformer 12.

The output signals of secondary windings 15, 16 and 17 are used to control the energization of transistor 28. Electrical energy emitted by winding 15 charges capacitor 51 and above a certain predetermined energy level also capacitor 37. Capacitor 37 may be directly connected to terminal 15" of secondary winding 15 through a conductor 38 and to terminal 15' of secondary winding 15 through an adjustable resistor 39.

The circuit in this form, namely where capacitor 37 is directly connected to winding 15 through conductor 38 and adjustable resistor 39, has a fixed time constant which is independent of the electrical condition of the source. The time constant can be varied depending upon the selected resistance values of the adjustable resistor 39 and capacitors 51 and 37. For certain types of relatively high speed relays such circuits will furnish the desired results. For most cases a variable time constant is required. This means that in order to have control over the inverse time-current characteristics of the relay, the time constant of the circuit must be a function of the energy level of the source connected to the primary winding 14 of transformer 12, and/or in addition to this must be a function of a predetermined single or multiple relay control requirement. In order to provide such flexibility at least one semiconductor switch such as, for example, a transistor 42 and control circuits are connected in series with resistor 39 in the manner shown in FIG. 1. It will become apparent that additional transistors connected in series with each other can be used to perform multiple control functions based upon receipt of a plurality of separate signals. It is also conceivable that such additional transistors may be connected in parallel with each other in which case each transistor controls independently from the other the rate at which the electrical charge is transferred to capacitor 37.

In the following description of FIG. 1 only one normally nonconducting semiconductor such as transistor 42 comprising a collector 40 and a base 55 is used. Collector 40 and emitter 41 are connected in series with a diode 43, resistor 44, diode 45, and conductor 46 to terminal 15' of winding 15 and through resistor 39 to one side of capacitor 37. Upon capacitor 37 receiving a predetermined electrical charge a complex mono-bistable electrical or electro-mechanical or electro-magnetic or electrochemical device is triggered into a state of conduction which renders transistor 28 conductive to pass energy such as pulses from secondary winding 17 of transformer 12 to terminals 20, 20'. The absorbed energy in capacitors 37 merely provides the required inverse time energy functions before triggering action is accomplished.

Transistor 42 is normally biased to cut off, but is rendered conductive upon the pulses transmitted from secondary winding 15 reaching a predetermined level. The predetermined level is established as the full load operating point of the relay. Transformer 12 transmits electrical energy up to a predetermined level without charging capacitor 37 because transistor 42 is retained biased in its nonconductive state. In order to determine the point of conduction of transistor 42 a shunting or sensing device or circuit 47 is arranged across the secondary winding 15 of transformer 12 and comprises a resistor 48, a zener diode 49 and a potentiometer 50. Shunting capacitor 51 is shown across secondary winding 15 and in series with resistor 44, and diode 45 for stabilizing purposes. Capacitor 51 is optional and may be eliminated for ultrafast operating relays or may be connected in series with a suitable resistor 44', as shown. Diode 45 and resistor 44 connected in series with secondary winding 15, as shown in FIG. 1, charge capacitor 51 on each electrical pulse of proper polarity applied to primary winding 14 of transformer 12. Zener diode 49 starts to break down at the instant the voltage across it reaches a predetermined value at which time it starts to pass current. When zener diode 49 passes current, a voltage will appear across resistors 48 which renders point 52 in circuit 47 positive with respect to point 53.

Point 52 is interconnected with a base 55 of transistor 42 through resistors 56 and 57. Making point 52 positive with respect to a point 53 puts or impresses a positive potential on base 55 of transistor 42 and renders it conductive. When zener diode 49 is non-conductive, only transistor leakage current flows through circuit 47 and the base 55 of transistor 42 is biased negative with respect to emitter 41 rendering transistor 42 nonconductive. In the nonconductive state of zener diode 49 only the voltage drop of approximately .6 volt appears across diode 43. When zener diode 49 conducts current, transistor 42 is rendered conductive and passes current through its emitter collector circuit to capacitor 37. The potential applied to base 55 of transistor 42 upon the conduction of zener diode 49 is known as bias. This bias is a differential potential between the potential drop built up across resistor 48 upon the conduction of zener diode 49 and the .6 volt drop across the diode 43. In order to limit the possible voltage drop across transistor 42 at cutoff to a predetermined value a zener diode 59 is applied in shunting arrangement across its emitter and collector elements.

In order to provide additional means for controlling the transfer of energy by means of transistor 42, voltages of varying polarity, phase angle and frequency may be applied to points 55 and 58 and across resistor 57 either continually or periodically for aiding or retraining the effect of the D.C. bias as provided by action of zener diode 49. Zener diode 49 may also be replaced by a suitable passive or active circuit element, such as an external switch, or a second D.C. or A.C. power source. In this manner a plurality of functions can be integrated by action of capacitor 37 in any desired mode or fashion.

In order to restrict the amount of energy transferred to capacitor 37 a restraining signal in addition to the D.C. bias is applied to base 55 of transistor 42 from secondary winding 16 of transformer 12 through circuits 60 and 61. Circuit 60 comprises a pair of diodes 62 and 63 connected at one point to each other and each to different terminal ends of secondary winding 16 and at said one point further connected in series with a pair of serially connected fixed or variable resistors 64 and 57. Circuit 61 comprises a conductor 65 connected at one end to the base 55 of transistor 42 and at the other end to the center tap 66 of secondary winding 16 of transformer 12. The voltage pulses from winding 16 are applied across resistor 57 and in combination with the signal from zener diode 49 render transistor 42 periodically conductive. Rendering transistor 42 conductive causes the emitter collector circuit of transistor 42 to conduct current. The restraining signal from winding 16 of transformer 12 renders transistor 42 conductive for only a part of a cycle so that the time duration of current conduction, for example, the width and amplitude of the current cycle passed by transistor 42 may be controlled. By varying the position of potentiometer 50 and resistance of resistor 64 the inverse time current characteristics of the relay may be varied. The resultant voltage V applied to base 55 of transistor 42 may be expressed by the following equation:

$$Vz - Vd - Vac = Vt$$

wherein $Vz$ is the voltage drop caused by the zener diode across resistor 48, $Vd$ is the .6 volt drop across diode 43, Vac is the instantaneous voltage drop across resistor 57 from the signal source of winding 16 and Vt is the resultant base to emitter control voltage on transistor 42.

As noted from FIG. 1 of the drawing the emitter and collector of transistor 42 are connected in series with the winding 15 of transformer 12, and when transistor 42 is biased for cutoff no charge is placed on capacitor 37. Because transistor 42 might pass a slight amount of current at high temperatures due to leakage current causing a charge to build up on capacitor 37 and eventually tripping the flip-flop circuits controlling transistor 28, another sensing circuit such as short circuit 70 is provided across capacitor 37. Short circuit 70 comprises a transistor 71 having an emitter 72, collector 73 and base 74. The emitter 72 and collector 73 are connected in series with a resistor 75 in shunt connection across capacitor 37, as shown. Transistor 71 is purposely kept conductive with the circuitry connected to its base 74 when transistor 42 is rendered nonconductive. Transistor 71 is rendered conductive upon a capacitor 82' being charged and by being connected to terminal 17' of winding 17 of transformer 12 through resistors 77, 78, 79, 80 and diode 81. Transistor 71 is rendered nonconductive upon a capacitor 82 being charged to a predetermined value. Capacitor 82 is connected through conductors 83, 34 and 33, to terminal 17" of secondary winding 17 of transformer 12 and through a conductor 84, resistor 85, diode 86 and conductors 22 and 21 to terminal 17' of secondary winding 17 of transformer 12.

A potentiometer 87 is connected in shunting arrangement across capacitor 82 with one terminal thereof connected through a zener diode 89 to a point 90 between the series connection of resistors 77 and 78. When the potential across capacitor 82 reaches a predetermined value, zener diode 89 breaks down and starts to conduct current. When zener diode 89 starts to conduct, the potential on base 74 of transistor 71 is changed from positive to negative with respect to its emitter 72 and the transistor 71 ceases to pass current through its emitter collector circuit. When transistor 71 becomes nonconductive the shunt circuit across capacitor 37 comprising the emitter collector circuit of transistor 71 is interrupted. A charge then builds up across capacitor 37 upon the conduction of the emitter collector circuit of transistor 42. A double anode zener diode 91 is connected in shunting arrangement across the emitter 72 and base 74 of transistor 71 and resistor 77 to protect the transistor against abnormally high voltage pulses which would destroy it.

As noted from the above, the controls of transistors 42 and 71 require coordination to start charging capacitor 37 when a predetermined voltage level has been reached by secondary winding 15. Thus, transistor 71 may be intermittently rendered nonconductive substantially simultaneously at the time transistor 42 is rendered conductive. When the voltage level of the electrical energy transmitted by secondary winding 15 is reduced to a predetermined value below the breakdown level of zener diode 49, shunting circuit 47 is deenergized and no longer conducts current and the potential on base 55 of transistor 42 is made less positive or rendered negative causing transistor 42 to become nonconductive. When transistor 42 becomes nonconductive, transistor 71 is rendered conductive. Transistor 71 is intermittently rendered conductive by the voltage of the pulses from secondary winding 17 being reduced proportionally with the reduction of the voltage level of pulses from secondary winding 15 causing zener diode 89 to be rendered nonconductive. The lack of current flow through zener diode 89 causes the potential applied to base 74 of transistor 71 to become more positive and transistor 71 to become conductive. As soon as transistor 71 becomes conductive, capacitor 37 is discharged. Capacitor 37 may be charged and discharged practically instantaneously.

Although capacitor 37 is disclosed as the electric pulse accumulator or energy storage device for storing the time voltage characteristics of a series of pulses, i.e. charged at a rate depending on the volt second characteristics of the pulses passed by the sensing circuit 47, other types of storage devices may be used. For example, a square loop magnetic core may be used which is energized in steps until it is saturated and will pass current. An inductance or a time relay device also may be used for a storage device. This invention is directed not merely to the use of a capacitor as a storage device, but among other things, to the method of charging the capacitor and its control by and with other static devices.

In order to increase the input impedance to the static flip-flop circuit controlling transistor switch 28 to refrain from unduly reducing the charge on capacitor 37, a pair of transistors 94 and 95 are used in a sensing circuit 96 provided for either continuously or sequentially checking the charge on this storage capacitor. In the structure shown in FIG. 1 the sensing circuit is continuously sampling the charge on capacitor 37. Transistor 94 comprises a base 97, emitter 98 and collector 99. Transistor 95 comprises a base 100, emitter 101 and collector 102. Base 97 of transistor 94 is connected to the positive terminal of capacitor 37 and the emitter 98 is connected to the base 100 of transistor 95. The collectors 99 and 102 of transistors 94 and 95, respectively, are connected through conductor 103, resistors 79 and 80, diode 81 and conductor 21 to terminal 17' of secondary winding 17 of transformer 12.

When capacitor 37 is charged to a predetermined voltage the positive charge is placed on base 97 of transistor 94. The emitter 98 of transistor 94 and the emitter 101 of transistor 95 assume essentially a potential slightly more positive than that of conductor 35 when capacitor 37 is in the state of discharge because of the leakage current flowing from wire 103 through collector 99 and emitter 98 of transistors 94 and collector 102 and emitter 101 of transistor 95, through zener diode 105 and resistor 104 to conductor 35. The voltage which appears between conductors 35 and 103 is limited by zener diode 173.

Transistors 94 and 95 are connected in a type of connection known as "compound-emitter-follower." The emitter potential will be slightly more negative than the base potentials of the respective transistors 94 and 95. Thus, if voltages rising on the capacitor 37 exceed the breakdown voltage of the zener diode 105, emitters 101 and 98 are held at a potential determined by the voltage drop across resistor 104 and zener diode 105. As the charge on the capacitor 37 continues to rise, bases 100 and 97 of transistors 95 and 94 will become more positive than the respective emitters 101 and 98 and current will now flow from terminal 17' of winding 17 through conductor 21, diode 81, resistor 80, resistor 79, conductor 103, collector 99 and emitter 98 and collector 102 and emitter 101 of transistors 95 and 94, respectively, and through zener diode 105, resistor 104, conductors 35, 34 and 33 to terminal 17" of winding 17.

Under this operating condition base current of transistors 94 and 95 is flowing from terminals 15" of winding 15 through conductor 38, base 97 and emitter 98 of transistor 94, base 100 and emitter 101 of transistor 95, zener diode 105, resistor 104, conductor 35, resistor 39, collector 40, emitter 41 of transistor 42, diode 43, resistor 44, diode 45, conductor 46 and terminal 15' of winding 15. During the period of conduction the charge on capacitor 37 will contribute considerably to the base current flow.

The conduction of transistor 95 through its emitter collector circuit actuates the switch or flip-flop circuit comprising transistors 106 and 107. Transistor 106 comprises a base 108, emitter 109 and a collector 110. Base 108 is connected at point 111 between resistor 104 and diode 105 in series circuit between conductors 103 and 35 in the emitter collector circuit of transistor 95. The flow of current through the latter circuit including the emitter and collector of transistor 94 applies a positive potential with reference to emitter 109 to base 108 of transistor 106 and renders it conductive. Current then flows from conductor 103 through conductor 113, collector 110, emitter 109 of transistor 106 and resistor 112 to conductor 35.

In the usual manner for flip-flop circuits of the type shown in the circuits for transistors 106 and 107 upon the flow of current through the emitter collector circuit of transistor 106 the base of transistor 107 is rendered negative with respect to its emitter 115 and current flows from conductor 103 (considered positive in polarity) through resistor 118, collector 116, emitter 115, conductor 117, resistor 112 to conductor 35 (considered negative in polarity). The discontinued flow of current through the emitter collector circuit of transistor 107 renders the base 120 of transistor 28 positive thereby rendering transistor 28 conductive. Transistor 28 then passes half wave A.C. current pulses from windings 17 through conductors 21, 22, diode 23, resistor 24, conductor 25, collector 26, emitter 27, conductor 29, primary winding 30 of transformer 31, diode 32 to the positive terminal 20' of the relay output signal terminals 20, 20'. The amplitude of the half wave signal passed by transistor 28 is limited by zener diode 174.

The secondary winding 121 of transformer 31 is connected across a diode 124 in series with a capacitor 130. The electrical pulses which are emitted by winding 121 when transistor 28 passes intermittently current through winding 30 are stored in capacitor 130. This voltage is added to the voltage existing between conductors 126 and 127 and triggers the neon light 122 into conduction. Current then flows from conductor 127 through resistor 132', normally closed push button 131', resistor 129 and resistor 125 to conductor 126 until push button 131 is operated interrupting the current flow causing the neon light to extinguish itself.

In accordance with the operation of the relay system illustrated in FIG. 1, pulses either constant or variable are fed into transformer 12. Secondary windings 15, 16 and 17 responsive to those pulses energize their respective circuits. Pulses or parts thereof from secondary winding 15 above a given voltage value are fed to storage capacitor 37. Transistor 42 provides a switching function in the circuit utilized to charge capacitor 37 from secondary winding 15. Transistor 42 operating as a switching device becomes conductive upon the transmission by secondary winding 15 of pulses above a predetermined voltage rating. When pulses of a predetermined voltage rating are transmitted by secondary winding 15, zener diode 49 in the shunting circuit 47 breaks down and conducts current. The conduction of current by shunting circuit 47 biases transistor 42 in the conductive direction. The bias potential applied to base 55 of transistor 42 is the resultant effect of three different and variable voltage values or signals as heretofore explained. Secondary winding 16 provides biasing, fully rectified pulses which in combination with the biasing affect of diode 43 limits the portions of or pulses passed by transistor 42 when rendered conductive. Transistor 42 when conductive passes discrete amounts of electric energy such as portions of parts or all of the pulses emitted by seconadry winding 15 to storage capacitor 37.

Storage capacitor 37 upon reaching a predetermined charge triggers the sensing circuit comprising the interconnected transistors 94 and 95. Upon energization of transistors 94 and 95 the flip-flop circuit comprising transistors 106 and 107 is energized thereby rendering transistor 28 conductive. Upon the conduction of transistor 28 pulses are passed from secondary winding 17 through transistor 28 and the annunciation device comprising transformer 31 to the output terminals 20, 20'. The annunciation device is triggered upon the energization of transformer 31 to illuminate the neon lamp 122 or provide an audible sound by means of suitable devices.

The new static relays disclosed have an outstanding advantage over the present induction type relays insofar as the static relays incorporate features which render them capable of resetting practically instantaneously. Spurious relay operation has often been blamed in the past for unexpected shutdown of parts of a distribution network as a result of switching operations or short circuits in other parts of the network. Coordination of induction type relays is difficult to accomplish because of the inertia of the rotating discs and because of the relatively long time it takes for the discs to return to their rest positions. In other words, if an overload condition develops in one part of the system, more than one overcurrent relay disc usually starts to move in the direction for closing pairs of cooperating contacts. One of these relays usually will close its cooperating contacts first and the resulting redistribution of the electrical load on the system will cause another relay to operate prematurely because it already has traveled in the direction of contact closure under the influence of previous overcurrent conditions.

Since there are no moving parts in the new and improved static relays disclosed there is no inertia. This enables the new static relays to adjust themselves relatively instantaneously to prevailing load distribution. Their resetting speed can be controlled, if so desired.

Figure 2:
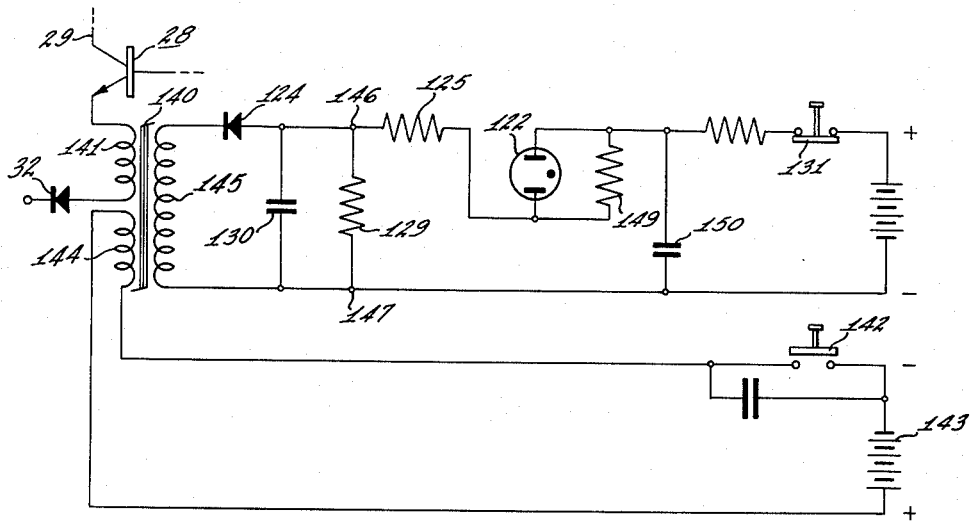
FIG. 2 illustrates a modification of the annunciator circuit shown in FIG. 1.

FIG. 2 of the drawing illustrates a modification of the structure shown in FIG. 1 wherein transformer 31 is replaced with a suitable magnetic memory core 140 which has a square loop characteristic. The number of turns of a winding 141 associated with core 140 and the current flowing through this winding during relay operation is co-ordinated with the characteristics of core 140 in such a manner that the magnetic state of the core is changed from one polarity to an opposite polarity. This may be from negative to positive or vice versa as well known in the art. After the magnetic core has been "set" it acts as a reference or memory device in which the information of relay operation has been stored in the form of the magnetic state of the core. It is therefore possible to seal such a device and remove it for subsequent inspection or use it as a means for indication of relay operation employing a circuit as shown in FIG. 1. Assuming that core 140 has been switched to one "set" stage by a current pulse due to relay operation it can be manually and electrically reset into its previous state by operation of the push button 142 which applies voltage from the source of potential 143 to the terminals of a winding 144 associated with core 140. The polarity of winding 144 is such that core 140 is returned to its original state in a known manner. The switching time is extremely short and during the process of resetting a voltage is induced in a winding 145 associated with core 140. This voltage is stored in capacitor 130 with diode 124 acting as a valve. At this time point 146 is negative with respect to point 147. The charge on capacitor 130 added to the supply voltage of the source 147 is enough to trigger or raise the voltage across lamp 122 to ignition value. This lamp will remain lit as long as the voltage across its terminals is above the ignition value. If the operator has noted the signal lamp he can reset it by operating push button 131 to open circuit position thereby briefly interrupting the flow of current to lamp 122 to extinguish it.

Figure 3:
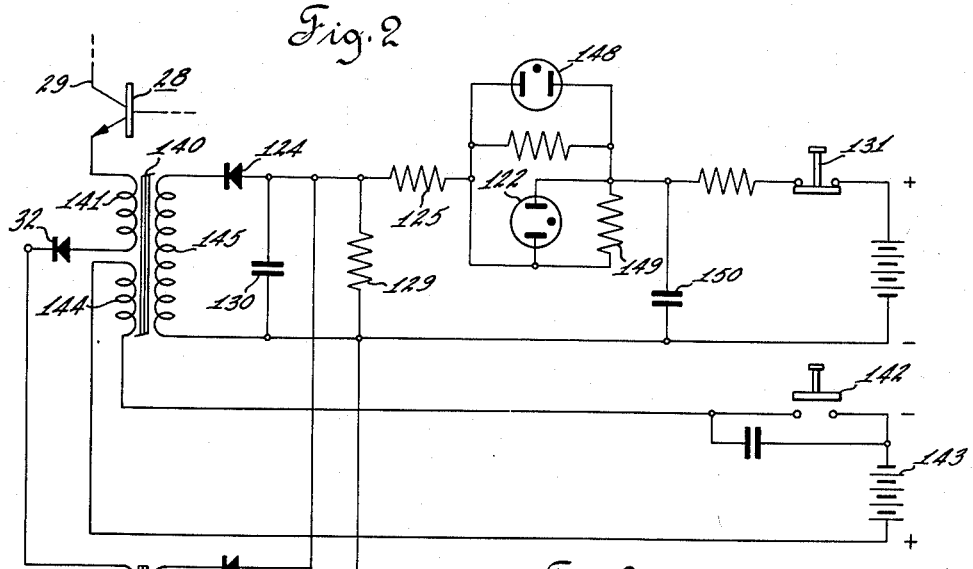
FIG. 3 illustrates a modification of the annunciator circuit shown in FIG. 2.

As shown in FIG. 3 indicating lamp 122 can be complemented by another remote indicating lamp 148 connected in parallel therewith.

As in FIG. 1 the resistor 129 in FIGS. 2 and 3 serves the purpose of providing a discharge path for capacitor 130 and resistor 125 limits the current flow through this circuit. The lamps 122 and 148 usually have a very high resistance when not ignited so that an additional resistor 149 is required in parallel therewith of very high resistance such as 500,000 to one million ohms to prevent a static charge being built up on the lamp electrodes which might prematurely light the lamp. Capacitor 150 shown in FIGS. 2 and 3 is provided to stabilize the circuit and particularly minimize the effect of inductive charges on the supply line 29.

If immediate indication of relay operation of the type provided in FIG. 1 is desired in combination with a memory record in case power failure should be so general that even the power supply to the lamp should be affected, core 31 of FIG. 1 and its associate windings 30 and 121 may be used in circuitry with core 140 and its associated circuit components as shown in FIG. 3. The function of this circuit wherein primary windings 30 and 141 are connected in series would be such that both cores 31 and 140 would be energized by electrical energy passed by transistor 28. Core 31 would function immediately to pass current through lamp 122 and ignite it. Core 140 would by the passage of energy through its winding 141 receive a "set" flux. The operator can at a later time relight the indicating lamp 122 by operating push button 142 which flips the core back into its original state and in doing so again ignites lamps 122 thereby showing that the relay had functioned. As shown in FIG. 3 this circuit may employ the remote indicating lamp 148.

In FIGS. 1, 2 and 3 diode 124 and capacitor 130 have been shown across the secondary winding of the inductive device which receives the signal pulse from transistor 28. It is noted hereby that the circuits disclosed also may be operated effectively, if so desired, without diode 124 and capacitor 130 forming a part thereof. In FIG. 3, diode 160 in series with winding 121 may be omitted, if so desired, and the circuit would operate satisfactorily.

Figure 4:
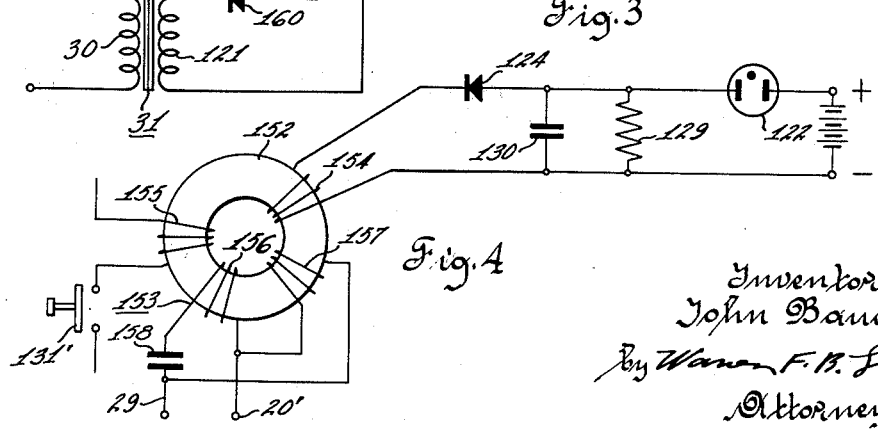
FIG. 4 illustrates a further modification of the annunciator circuit shown in FIGS. 1-3.

Under certain operating conditions induced current in the memory core circuits may untimely "set" the core and cause it to flip from one flux state to another by an accumulation of the effects of small current surges. In order to prevent this from happening the indicating lamp circuit of FIG. 4 may be used. FIG. 4 discloses a core 152 of the type shown in FIG. 2 having a winding 153 which may be connected to transistor 28 and terminal 20' through diode 32 in the manner shown in FIG. 1. Winding 154 is connected with diode 124, capacitor 130, resistor 129, lamp 122 across a suitable source of potential which may be of an alternating or direct current type. Winding 155 is connected in series with switch 131' across an auxiliary source such as the direct current source of FIG. 2.

As shown in FIG. 4 winding 153 may comprise two substantially equal portions 156, 157 wound and connected in opposition to each other on core 152. A capacitor 158 is connected in series with portion 156. Small current pulses of short duration which would enter these two portions will create two flux components in core 152 which would oppose each other and therefore would be ineffective to set the core or change its flux characteristics so as to switch it from one condition to another. If the relay functions properly and transistor 28 transmits current pulses of sufficient duration to permit capacitor 158 to charge then only will current flow in one portion of the winding which is intended to "set" the core properly. Thus, small inductive surges cannot cause a malfunction of the indicating system.

FIG. 5 discloses a modification of the inductive device arrangement shown in FIG. 3 wherein winding 121 is wound on core 140. Core 31 and its winding 30 shown in FIG. 3 have been omitted. In this arrangement lamps 122 will be ignited immediately indicating relay operation and at the same time core 140 under the effects of a build up of a given flux condition will "set" the core in the manner heretofore described.

FIG. 6 illustrates a further modification of the structure shown in FIGS. 3 and 5 wherein the secondary winding on core 140 is provided with a center tap and the portion 145' of this winding serves the same function as winding 145 of the structure shown in FIG. 3 and portion 121' thereof serves the same function as winding 121 of the structure shown in FIG. 5.

As shown, a plurality of registration devices may be used to record or visually indicate relay conditions. These registration devices may include any form of device which momentarily indicates or permanently records relay operation such as indicating lamps or targets, memory cores, capacitive storage means, etc. only a few of which have been shown for illustrative purposes.

In the drawings the polarity marks on the windings of the inductive devices are in accordance with the convention of the American Standards Association, wherein instantaneous direction of current into one polarity mark will induce a voltage in another winding corresponding to current out of the polarity mark thereon. This applies particularly to inductive devices operated from power sources of alternating current.

Although but a few embodiments of the present invention have been illustrated and described, it will be apparent to those skilled in the art that various changes and modifications may be made therein without departing from the spirit of invention or from the scope of the appended claims.

Having now particularly described and ascertained the nature of my said invention and the manner in which it is to be performed, I declare that what I claim is:

1. An indicating circuit comprising a pair of magnetic cores, a primary winding and a pair of secondary windings mounted on one of said cores and a primary winding and a secondary winding mounted on the second of said cores, each of said primary windings being connected in series across a source of electrical energy, the first one of said secondary windings mounted on said first core being connected in series with a visual registration device, the second one of said secondary windings being connected to an auxiliary source of potential, said secondary winding of said second core being connected across said registration device, said second core upon energization of said primary winding mounted thereon triggering said registration device, said primary winding on said first core upon predetermined energization thereof causing a predetermined flux setting of said first core, said second secondary winding on said first core upon energization thereof reversing said flux setting of said first core and thereby causing said first secondary winding on said first core to trigger said registration device.

2. An indicating circuit comprising:
a pair of magnetic cores,
a primary winding and a pair of secondary windings mounted on one of said cores and
a primary winding and a secondary winding mounted on the second of said cores,
each of said primary windings being connected to a source of electrical energy,
the first one of said secondary windings mounted on said first core being connected to a visual registration device,
the second one of said secondary windings being connected to an auxiliary source of potential,
said secondary winding of said second core being connected to energize said registration device,
said second core upon energization of said primary winding mounted thereon energizing said registration device,
said primary winding on said first core upon predetermined energization thereof causing a predetermined flux setting of said first core,
said second secondary winding on said first core upon energization thereof reversing said flux setting of said first core and thereby causing said first secondary winding on said first core to energize said registration device.

3. An indicating circuit comprising:
a pair of magnetic cores,
a first, second and third winding mounted on one of said cores and a fourth and fifth winding mounted on the second of said cores, means for simultaneously energizing the first and fourth windings;

a registration device connected to be energized by the second winding and the fifth winding; said fifth winding responsive to energization of the fourth winding to energize said registration device; and means for energizing the third winding;

said first winding upon energization causing a predetermined flux setting of said first core, and said third winding upon energization reversing said flux setting of the first core, and said second winding and registration device connected to energize said registration device upon reversing of said flux setting.

References Cited by the Examiner
UNITED STATES PATENTS 2,697,178  12/54  Isborn _____ 307—88
2,851,677   9/58  Crooks _____ 340—174

IRVING L. SRAGOW, *Primary Examiner.*